US005590528A

United States Patent [19]

Viteri

[11] Patent Number: 5,590,528

[45] Date of Patent: Jan. 7, 1997

[54] TURBOCHARGED RECIPROCATION ENGINE FOR POWER AND REFRIGERATION USING THE MODIFIED ERICSSON CYCLE

[76] Inventor: Fermin Viteri, 3058 Kadema Dr., Sacramento, Calif. 95864

[21] Appl. No.: 137,980

[22] Filed: Oct. 19, 1993

[51] Int. Cl.[6] .................. F02C 1/10

[52] U.S. Cl. .................. 60/684; 60/682

[58] Field of Search .................. 60/650, 682, 684, 60/39.45, 269

[56] References Cited

U.S. PATENT DOCUMENTS 3,797,427 3/1974 Schwartzman .................. 60/622

3,995,431 12/1976 Schwartzman .................. 60/682

4,403,477 9/1983 Schwarzenbach .................. 60/682

OTHER PUBLICATIONS

Wood, Bernard D. *Applications of Thermodynamics,* 2d. Addison–Wesley Publishing Co., ©1982 Philippines.

Lamm, Michael; "The Big Engine That Couldn't" American Heritage of Invention & Technology, Winter 1993 vol 8/No. 3 pp. 40–47; Forbes Inc., Forbes Bldg 60 Fifth Avenue New York, N.Y. 10011; Plus 4 Pages of Inventors Calculations.

Faires, Virgil Moring; "Applied Thermodynamics," The Macmillan Co. New York , 1949, Copyright 1947 pp. 68, 69, 71, 72, 73, 97, & 128.

*Primary Examiner*—Leonard E. Heyman

*Attorney, Agent, or Firm*—Bradley P. Heisler

[57] ABSTRACT

A Modified Ericsson Turbocharged Reciprocating Engine (METRE), is provided which exhibits a high thermal efficiency for power and refrigeration applications. A Modified Ericsson cycle can include 2, 3, 4, or more stages (number of intercooling and heat/reheat cycles between stages). As stages are added, both cycle efficiency and power density (power/weight flow) increase, therefore, trade-offs between higher performance and number of stages (system complexity, cost, etc.) are necessary to optimize the engine. By combining a turbocompressor for the low pressures of the cycle and a multi-piston reciprocating engine for the high pressures of the cycle, a light weight, highly fuel-efficient, low-polluting, engine can be achieved. The METRE is highly suited for the power range of automobiles and trucks. This engine can use low technology (lower turbine temperatures, efficiencies, etc.) as well as high technology components (higher turbine temperatures, efficiency etc.) and remain competitive with Brayton, Stirling, gas and Diesel engines. The Ericsson cycle, like the Brayton and Stirling, utilizes external combustion or heating and thus can use readily available optional fuels such as natural gas, kerosene, propane, butane and gases derived from coal. Solar and nuclear energy are also useable heat source candidates.

19 Claims, 9 Drawing Sheets

POSITIVE DISPLACEMENT
ENGINE PRESSURE VERSUS
VOLUME-CYCLE CHARACTERISTICS

42 —VALVE SEQUENCE:

A – INLET VALVE OPENS
B – INLET VALVE CLOSES
C – DISCHARGE VALVE OPENS
D – DISCHARGE VALVE CLOSES
$V_D$ – DISPLACEMENT VOLUME
W – ENCLOSED AREA: WORK

MODIFIED ERICSSON
TURBO-SUPERCHARGED
RECIPROCATING ENGINE (METRE)
CONCEPTS

EG – ELECTRIC GENERATOR
GB – GEARBOX
T – TURBINE
C – COMPRESSOSR
IC – INTERCOOLER
RG – REGENERATOR
CB – COMBUSTOR
R – REHEATER

OPEN CYCLE:
•AIR/FUEL/HOT GAS

2-CYLINDER METRE
2 STAGE MODIFIED ERICSSON

CLOSED CYCLE:
•HELIUM
•NITROGEN
•ARGON
•ETC.

8-CYLINDER METRE
5 STAGE MODIFIED ERICSSON CYCLE

TURBINE/COMPRESSOR EFFICIENCY
VERSUS SPECIFIC SPEED

WHERE: COMPRESSOR/TURBINE $$N_S = \frac{NQ^{1/2}}{H^{3/4}}$$

N – SPEED,RPM
Q – FLOW RATE-FT$^3$/SEC (INLET/OUTLET)
H – HEAD,FT (RISE/DROP)

THERMAL EFFICIENCY
FOR BRAYTON AND ERICSSON CYCLES

THERMAL EFFICIENCY FOR BRAYTON AND ERICSSON CYCLES

COMPRESSOR POWER COEFFICIENT:

$$CPC = \frac{P_C}{\frac{778}{550} C_P T_{MIN}} = \frac{P_{RS}^{\alpha} - 1}{\eta_C}$$

TURBINE POWER COEFFICIENT WHEN $\epsilon = 1$:

$$TPC = \frac{P_T}{\frac{778}{550} C_P T_{MIN}} = \eta_T T_R \left[ \frac{(KP_{RS})^{\alpha} - 1}{(KP_{RS})^{\alpha}} \right]$$

TURBINE POWER COEFFICIENT WHEN $\epsilon < 1$:

$$TPC' = \epsilon TPC + (1 - \epsilon) \left[ T_R - 1 - CPC \right]$$

SPECIFIC POWER COEFFICIENT FOR n STAGES:

$$SPC = n(TPC - CPC)$$

INPUT POWER COEFFICIENT FOR n STAGES:

62 $$IPC = TPC' + (n-1)TPC = nTPC + (1 - \epsilon)(T_R - 1 - CPC - TPC)$$

CYCLE THERMAL EFFICIENCY- $\eta$:

61 $$\eta = \frac{SPC}{IPC}$$

WHERE:

$\alpha = \frac{\gamma - 1}{\gamma}$ $\gamma$ – GAS SPECIFIC HEAT RATIO $C_P$ –GAS SPECIFIC HEAT RATIO @ CONSTANT PRESSURE $T_R = T_{MAX}/T_{MIN}$ $P_{RS}$ – STAGE PRESSURE RATIO $\eta_C$ – COMPRESSOR EFFICIENCY $\eta_T$ – TURBINE EFFICIENCY $\epsilon$ – REGENERATOR EFFECTIVENESS $K = \left(1 - \frac{\Delta P_{LOSS}}{P}\right)$ PRESSURE LOSS COEFFICIENT $P_C$ – COMPRESSOR SPECIFIC POWER, $\frac{SHP}{LB/SEC}$ $P_T$ – TURBINE SPECIFIC POWER, $\frac{SHP}{LB/SEC}$ n – No. OF INTERCOOLINGS, HEAT/REHEATS (STAGES)

NOTE:

| n | $\epsilon$ | EFFICIENCY |
|---|---|---|
| 1 | 1 | MODIFIED ERICSSON STAGE |
| 1 | <1 | REGENERATIVE BRAYTON |
| 1 | 0 | NONREGENERATIVE BRAYTON |

*Fig. 6B*

TURBOCHARGED RECIPROCATION ENGINE FOR POWER AND REFRIGERATION USING THE MODIFIED ERICSSON CYCLE

BACKGROUND OF THE INVENTION

1. Field of the Invention

The present invention relates to machinery designs and supporting component integration (intercoolers, regenerator, combustor or heater and reheaters) for achieving a high thermal efficiency engine.

The engine is based on the Modified Ericsson cycle, capable of using low technology as well as advanced technology components, that are combined into various optional systems for power, efficiency, and ease of development considerations.

The above and other features of this invention will be more fully understood from the following detailed description of the engine, a discussion of various design options and the accompanying drawings.

2. Description of Related Art

The subject invention pertains to the selection of rotating and reciprocating machinery along with the integration of this machinery with intercoolers, a regenerator and a high temperature combustor or heater and reheaters to achieve a very high efficiency engine based on the Modified Ericsson cycle. This engine has the size and operating charateristics that are comparable to or better than current internal combustion automobile and truck engines. These include: (1) higher efficiency potential; (2) lower working fluid operating temperatures and pressures and thus lower exhaust gas pollutants; (3) external combustion that can use optional fuels such as natural gas, lower grade fuels other than high octane gas (kerosene, propane, butane) and gases derived from coal.

The Ericsson cycle, although not currently used for reasons to be discussed, remains an attractive cycle because it, like a Stirling, ideally achieves Carnot efficiencies when operated between given upper and lower temperature limits. Ericsson engines have been used in the past to a limited extent, however, the mean effective pressure was too low for it to compete with internal combustion or steam engines. In a non-flow cycle such as hot gas in a cylinder, the work is obtained through the action of a moving piston being acted upon by a variable pressure. The net average pressure, called mean effective pressure (m.e.p.), times the displacement volume of the cylinder represents the work produced in one stroke. Low m.e.p. results in a large engine for a given power and thus a heavier design.

A practical way to overcome the low m.e.p., in order to take advantage of this high efficiency cycle, is the incorporation of a supercharger using a high speed turbocompressor for the first stage of the cycle. This addition allows a compressor of much smaller size than a comparable reciprocating design to perform the gas compression and expansion at the low ambient pressures.

By combining a turbocompressor for the low pressures of the cycle and a multi-piston reciprocating engine for the high pressures of the cycle along with intercoolers, a regenerator, a combustor or heater and reheaters, various versions (stages) of the Modified Ericsson cycle can be achieved. The Modified Ericsson approximates the Ideal Ericsson isothermal compression by using multiple stages of compression, with intercooling between stages, and the isothermal expansion by using multi-power expansion (turbine) stages, with reheat between stages. The regenerator is used to recover the exhaust heat from the last turbine stage and deliver it to the final stage compressor discharge gas prior to entering the combustor or heater. A high efficiency (also called effectiveness) regenerator is a key component in a regenerative thermal cycle. However, as stages are added to a Modified Ericsson cycle, the regenerator effectiveness becomes less critical to the overall cycle efficiency. This significant factor makes a multi-stage Modified Ericsson engine very attractive for a regenerative cycle and the benefits will be discussed in more detail in the following section.

SUMMARY OF THE INVENTION

The present invention provides a means for achieving the high thermal cycle efficiencies of the Modified Ericsson cycle using a combination of: (1) high speed turbocompressor for the low pressure high flow rate initial stage, and (2) reciprocating machinery for the high pressure low flow rate later stages of the cycle.

Using this combination, the Modified Ericsson Turbosupercharged Reciprocating Engine (METRE), achieves thermal efficiencies in the 50% to 60% range, as compared to 30% for current internal combustion gas engines and 40% for Diesels.

The METRE high efficiency thermodynamic cycle has many applications including: (1) power generation for space and earth, (2) drive motors for sea and land transportation, and (3) refrigeration application; such as helium liquefication for superconductivity, cryogenic fluid production, cooling of high speed computers and electronic equipment, and air-conditioning. Current cycles being used today are less efficient, except for the Stirling cycle. However, the Stirling cycle, operates at much higher pressure levels (3 to 5 times), than the METRE.

Since METRE uses both turbo, also referred to as dynamic, and reciprocating machinery in its power and refrigeration cycle, advanced technology can be used which is currently being developed by the gas turbine industry, the automotive industry, NASA and the Department of Energy (DOE).

This technology includes: (1) ceramic turbines, combustors, heaters, regenerators, etc., (2) electronic fuel metering sensors and controls, (3) light weight aluminum blocks, (4) ceramic pistons, liners and valves, and (5) high strength, light weight carbon-carbon composites for lines and ducting. By combining the high efficiency power cycle of METRE with this advanced technology, a highly fuel-efficient, low-polluting, engine is possible.

DESCRIPTION OF THE PREFERRED EMBODIMENTS

Figure 1:
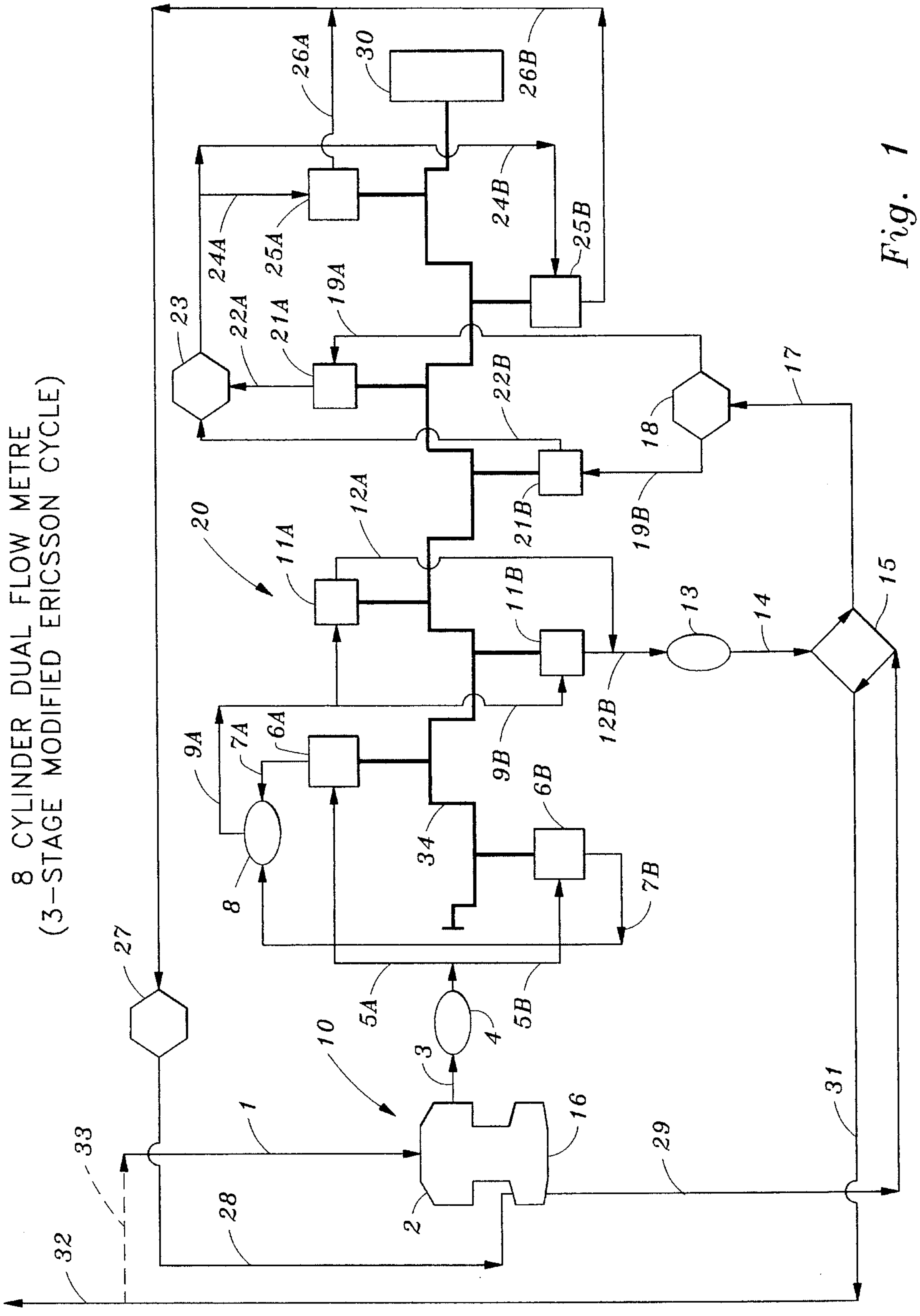
FIG. 1 is a flow diagram illustrating a Modified Ericsson Turbocharged Reciprocating Engine (METRE) according to the subject invention.

According to one embodiment of the present invention, a Modified Ericsson Turbocharged Reciprocating Engine (METRE) shown in FIG. 1, consists of an independent turbine driven centrifugal type compressor assembly 10 operating in series with a multi-piston reciprocating engine 20 and gearbox 30.

Engine operation begins as gas flow enters the centrifugal compressor 2, through inlet duct 1 and is raised to design discharge pressure; it exits through duct 3 into intercooler 4 where the heat of compression is removed by external cooling means (i.e. air, water, Freon etc.). After the gas exits intercooler 4 through ducts 5A 5B at a temperature equal to the compressor gas-flow at the inlet; it enters the reciprocating compressors 6A 6B and is raised to the design pressure. The gas then exits through ducts 7A 7B into intercooler 8 and is again cooled to the inlet temperature of the compressors 26A–26B. This compression/cooling cycle is repeated as the gas flows through inlet ducts 9A 9B, compressors 11A 11B, exit ducts 12A 12B, and intercooler 13, to complete the pressurizing and cooling phase of the cycle. This phase can include 2, 3, 4, or more stages, depending upon the design over-all pressure ratio, the pressure rise per stage considered optimum for high cycle efficiency, and other considerations including structural limits.

Note, the last intercooler 13 could be located at inlet duct 1 for a "closed cycle" (helium, nitrogen, argon, etc.), however, the size and weight would increase because the lower pressure gas requires larger flow areas to maintain constant velocities and larger heat transfer surface area due to lower heat transfer coefficients on the gas side. For "open cycles" (air/fuel) intercooler 13 can be eliminated.

After the gas is cooled by intercooler 13 to the inlet temperature of compressors 11A 11B, it exits through duct 14 and enters the regenerator 15 where heat is absorbed from the exhaust gas exiting the turbocompressor turbine 16 through duct 29, discussed below. The as then exits through duct 17 into the combustor 18 "open cycle", or heater 18 "closed cycle" where additional heat is added until the maximum allowable operating temperature is reached. The high pressure hot gas exits through ducts 19A 19B and enters pistons 21A 21B, functioning as reciprocating expanders, where the hot gas expands and exhausts through ducts 22A 22B. The hot gas then enters reheater 23, where the gas is again reheated to maximum allowable operating temperature and exits through ducts 24A 24B, enters pistons 25A 25B, expands and exits through ducts 26A 26B. The gas then enters reheater 27 where it is again reheated to maximum allowable operating temperature. It then exits through duct 28 and drives the turbocompressor turbine 16 of the assembly 10. The turbine exhaust gas exits through duct 29 and enters the regenerator 15 where it gives up heat, as noted above, to the high pressure gas exiting intercooler 13 and duct 14. The gas exiting through duct 31 can either discharge to the atmosphere through duct 32 to complete an "open-cycle" system, or it can return to the compressor inlet through duct 33, where it begins a new cycle for a "closed cycle" system. The net output power produced by the cycle is extracted through the gearbox 30 connected to the reciprocating engine drive shaft 34.

In general various types of compressors and turbines can be used with a Modified Ericsson cycle. At lower power levels, positive displacement, including reciprocating machinery, are more efficient up to approximately 500 horsepower. As power increases beyond this range, centrifugal and axial flow compressors and turbines, also called dynamic compressors and dynamic turbines, become more efficient and have higher power to weight ratios.

Figure 2:
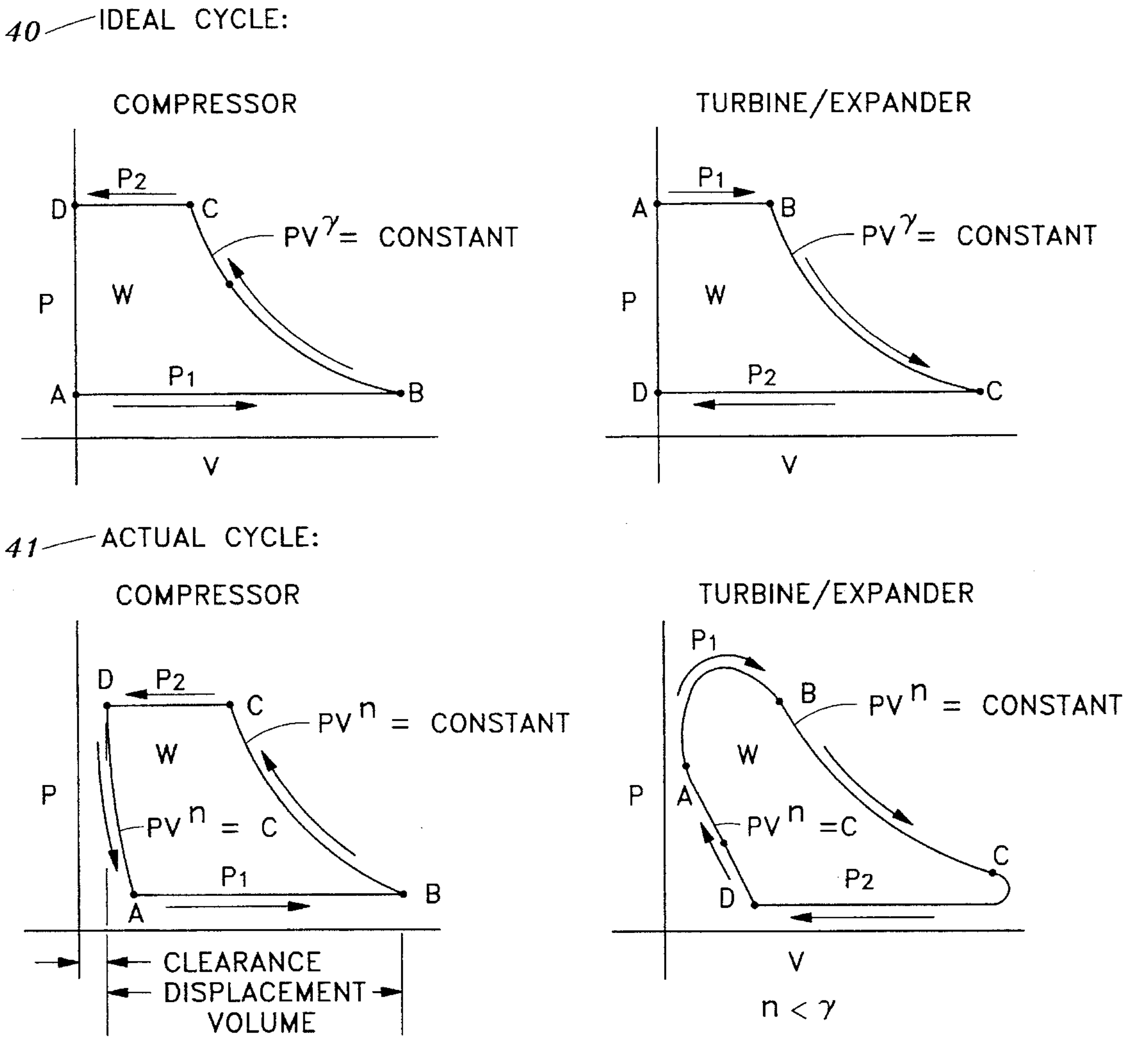
FIG. 2 is a thermal cycle diagram illustrating the pressure and specific volume characteristics of a reciprocating piston engine.

The basic characteristic of compression and expansion for a reciprocating engine is shown in FIG. 2 for one cycle (one complete revolution of the piston). It should be noted that, unlike an internal combustion engine, the compression and expansion phase of a Modified Ericsson engine are performed by separate pistons with a compression and expansion occurring during each revolution of the pistons. Both the ideal 40 and actual cycles 41 are shown along with the valve sequencing 42.

Figure 3:
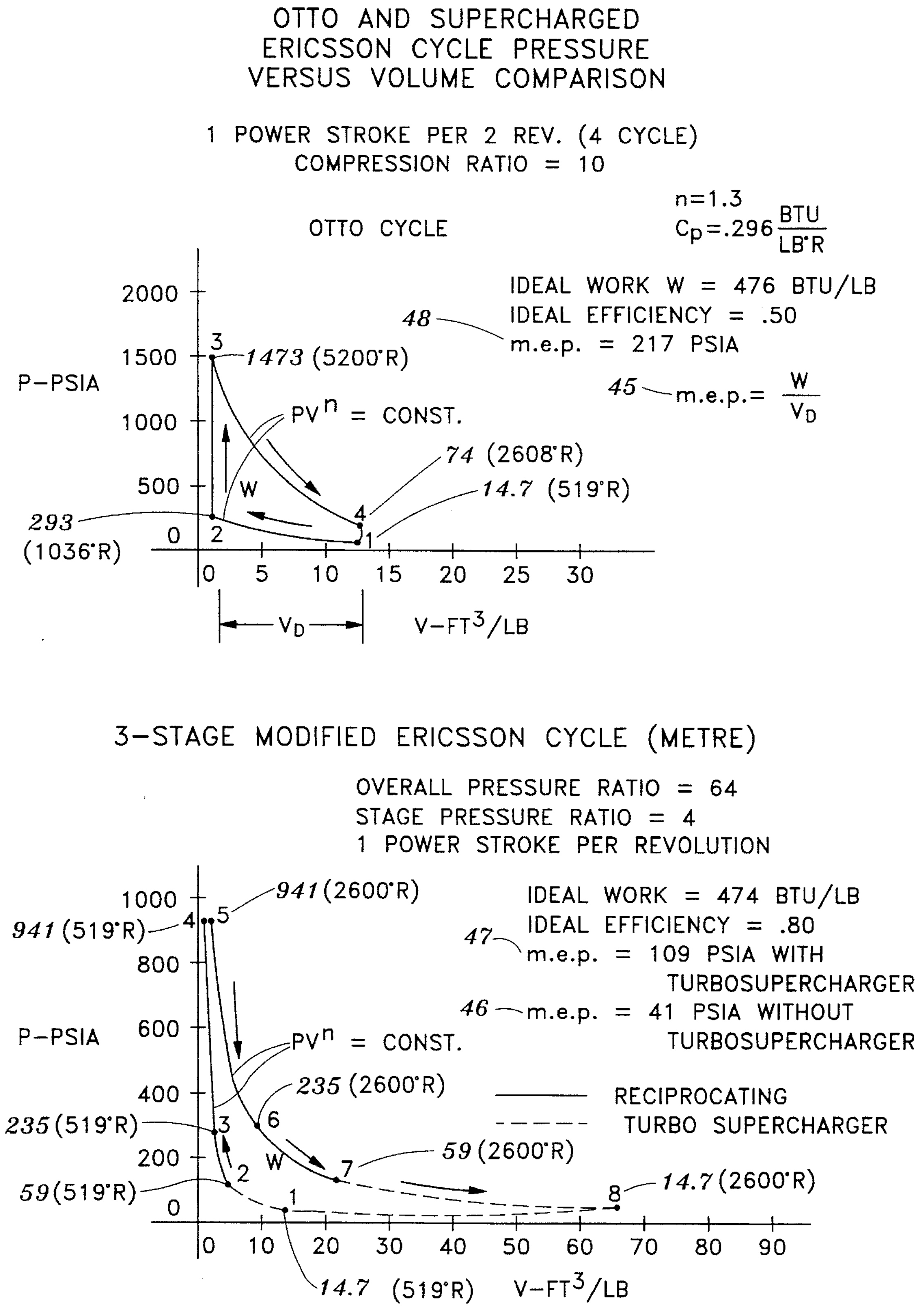
FIG. 3 is a thermal cycle diagram illustrating the pressure and specific volume characteristics of an internal combustion gas engine cycle and a multi-stage Modified Ericsson engine cycle.

A comparison of typical pressures, temperatures and specific volumes for an internal combustion engine and a typical Modified Ericsson engine is shown in FIG. 3. The METRE solves a major deficiency, of a reciprocating engine operating with a Modified Ericsson cycle, of low mean effective pressure (m.e.p.) 45, as illustrated in FIG. 3. The turbocompressor increases the m.e.p. from 41 psia 46 to 109 psia 47. Therefore METRE becomes more-competitive, in terms of size, with the internal combustion engine m.e.p. of 217 psia 48. In addition, METRE efficiencies are higher (55% versus 30%) and these will be discussed later.

Figure 4:
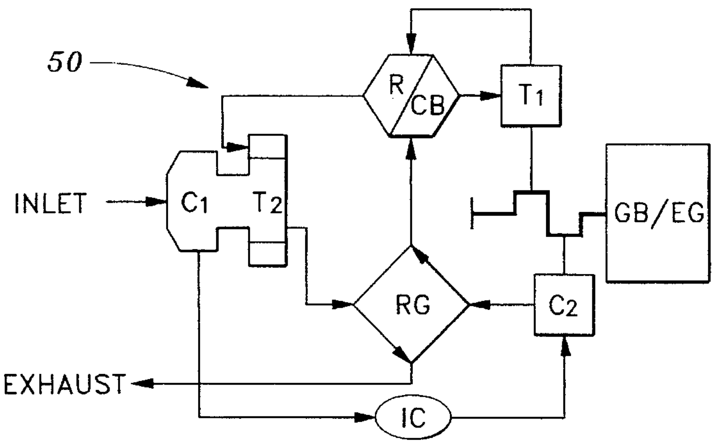
FIG. 4 is a flow diagram illustrating alternate METRE concepts according to the subject invention.
Figure 4:
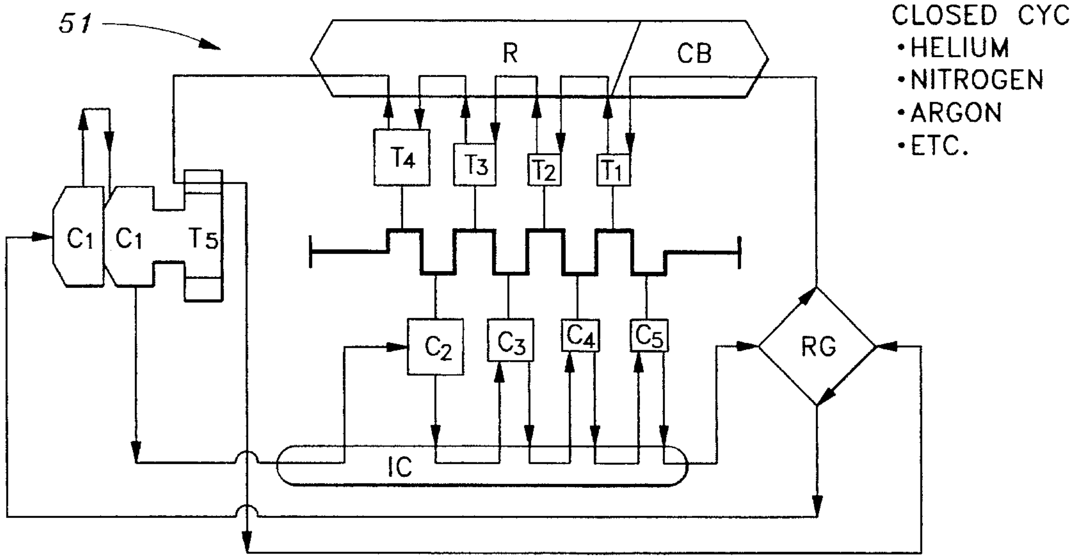

Alternate concepts of METRE are illustrated in FIG. 4. The 2-cylinder METRE 50 shows the simplest type design and may be used for either an "open" or "closed" cycle. The 8-cylinder METRE concept 51 is an attractive concept for a helium system where many low pressure ratio stages ($P_r$=2 to 3) are required to achieve high efficiency cycles.

Another feature of METRE is that the turbocharger and reciprocating engine can each operate at or near optimum speed to achieve maximum efficiency. This speed corresponds to the optimum specific speed of the units and is defined as:

$$N_S=N*Q{\frac{1}{2}}/H{\frac{3}{4}}$$

WHERE: (compressor/turbine)

N-speed

Q-volume flow rate (inlet/exit)

H-head (rise/drop)

Figure 5:
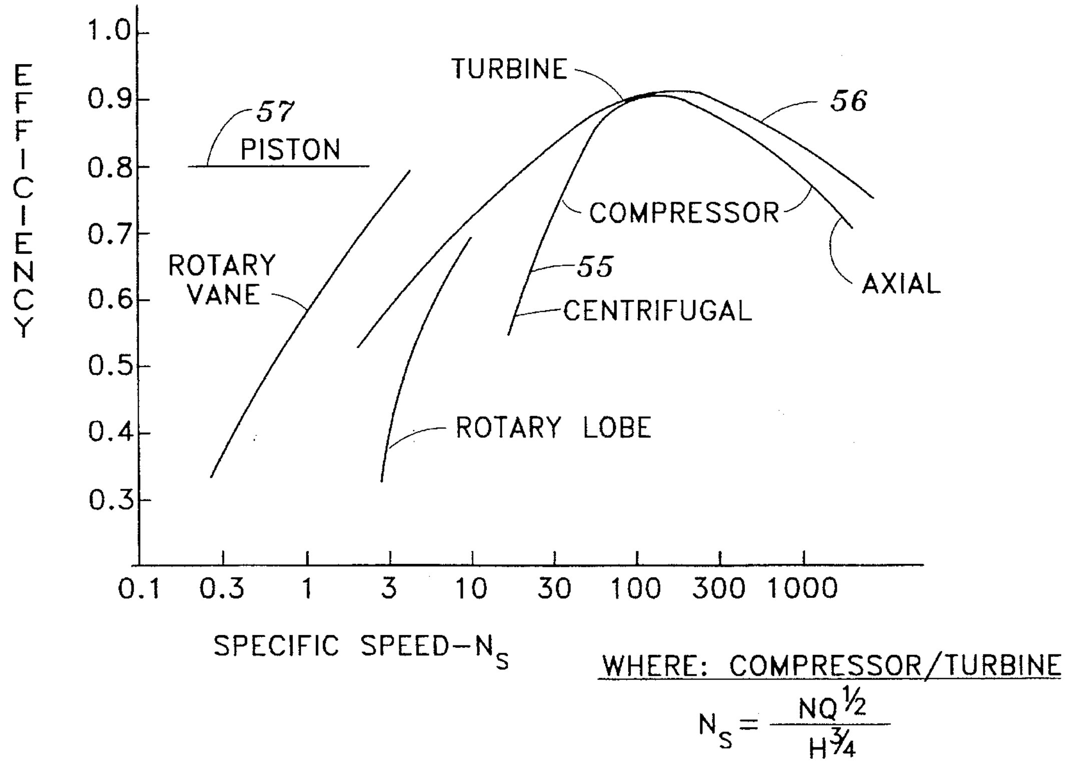
FIG. 5 is a graph illustrating compressor and turbine efficiencies as a function of their specific speed parameter.

Specific speed as defined above is an aerodynamic flow parameter of rotating and positive displacement machinery and the corresponding efficiency is presented in FIG. 5. FIG. 5 illustrates that the maximum efficiency (~90%) for rotating machinery 55 56 has an optimum specific speed ($N_s\sim200$)

while that for reciprocating piston type 57 remains constant (80%) over a specified range ($N_s$~0.2 to 0.3). Thus, the speed of multi-stage rotating machinery should increase with increasing pressure (since volume flow rate decreases) while that for reciprocating machinery can remain constant over a wide range of pressures for maximum cycle efficiency.

Figure 6A:
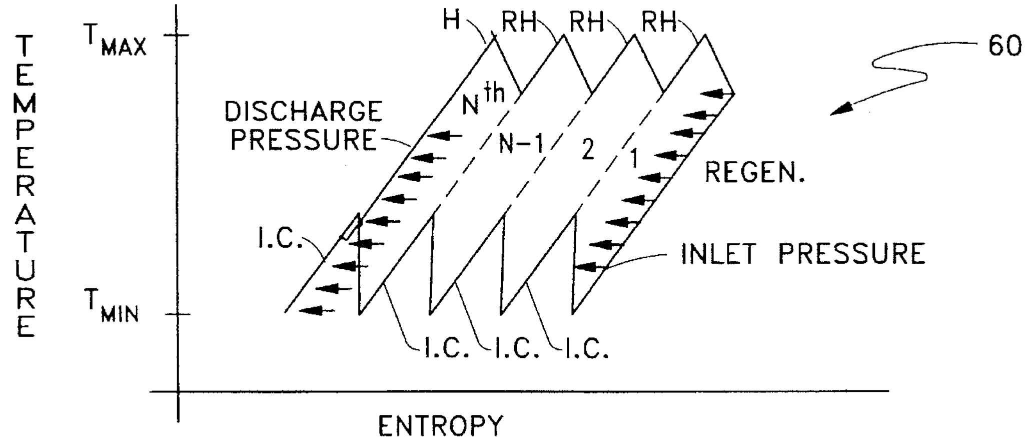
FIG. 6 is a thermal cycle diagram and related equations illustrating the general cycle thermal efficiency and specific power coefficient equations for Brayton and Modified Ericsson cycles.
Figure 6A:
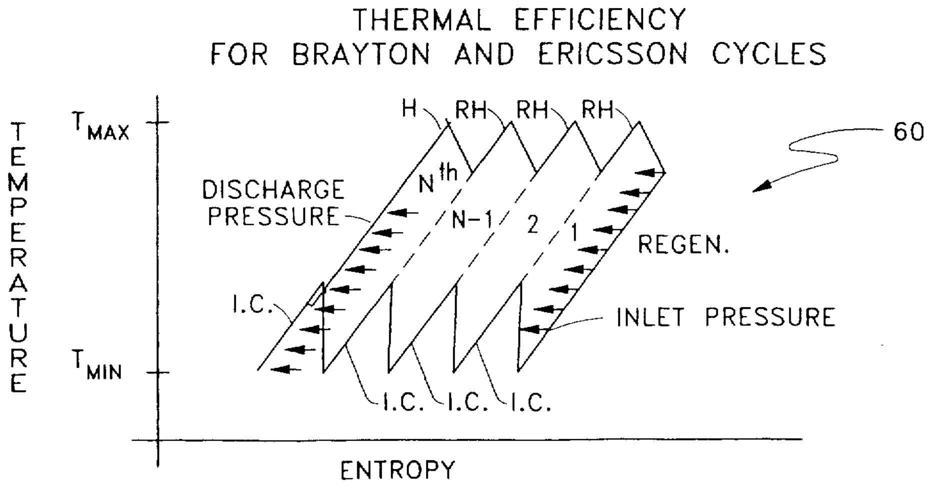
Figure 7:
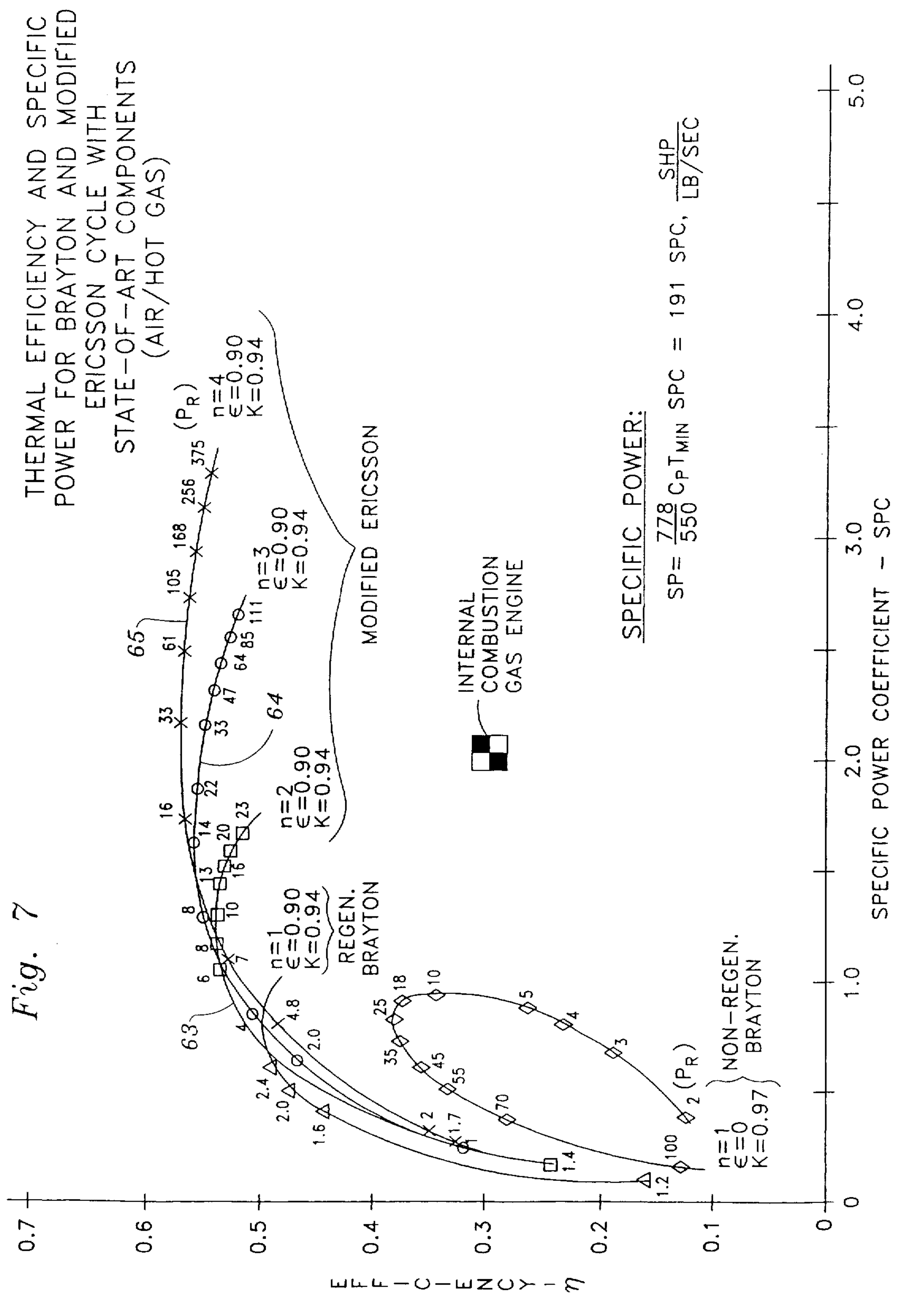
Figure 8:
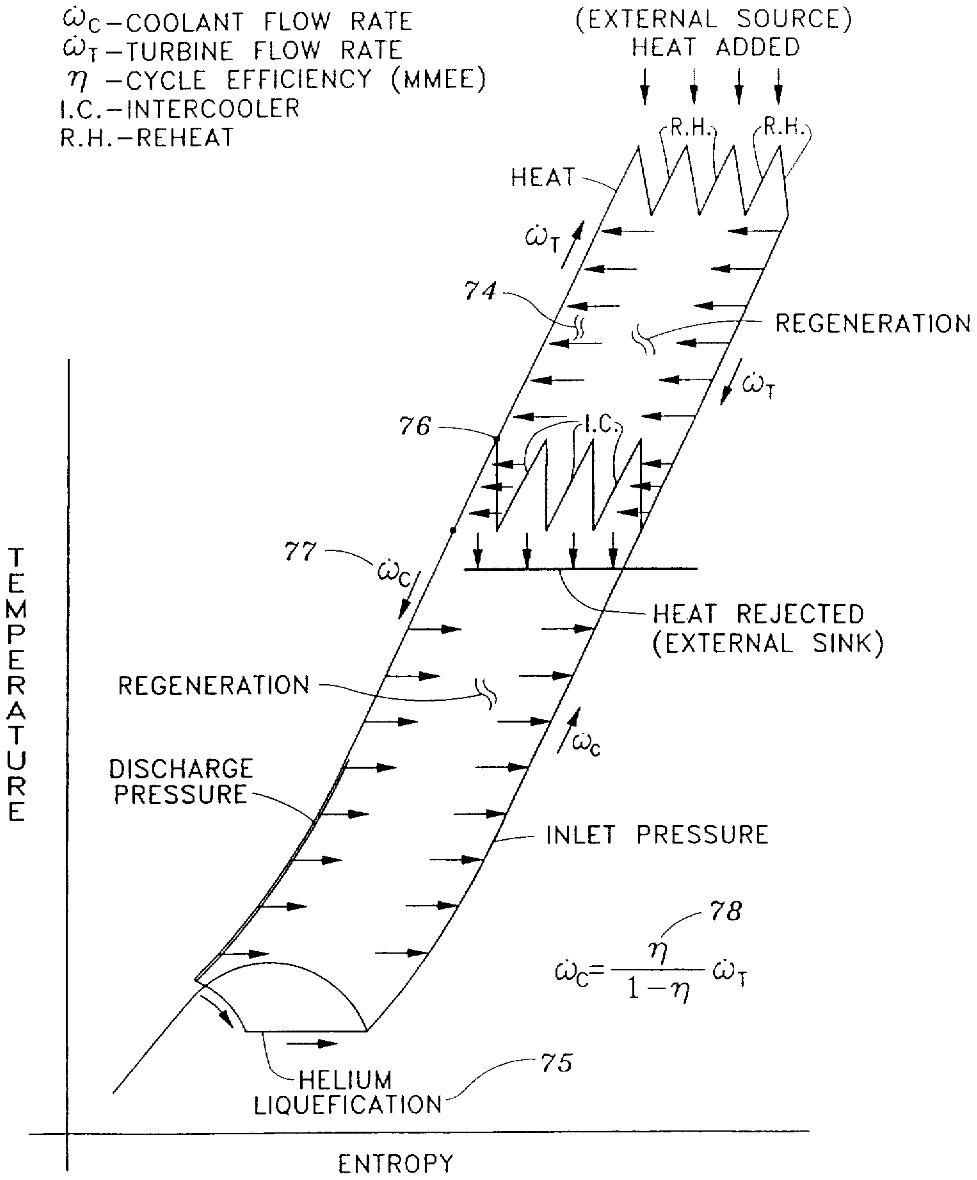
Figure 9:
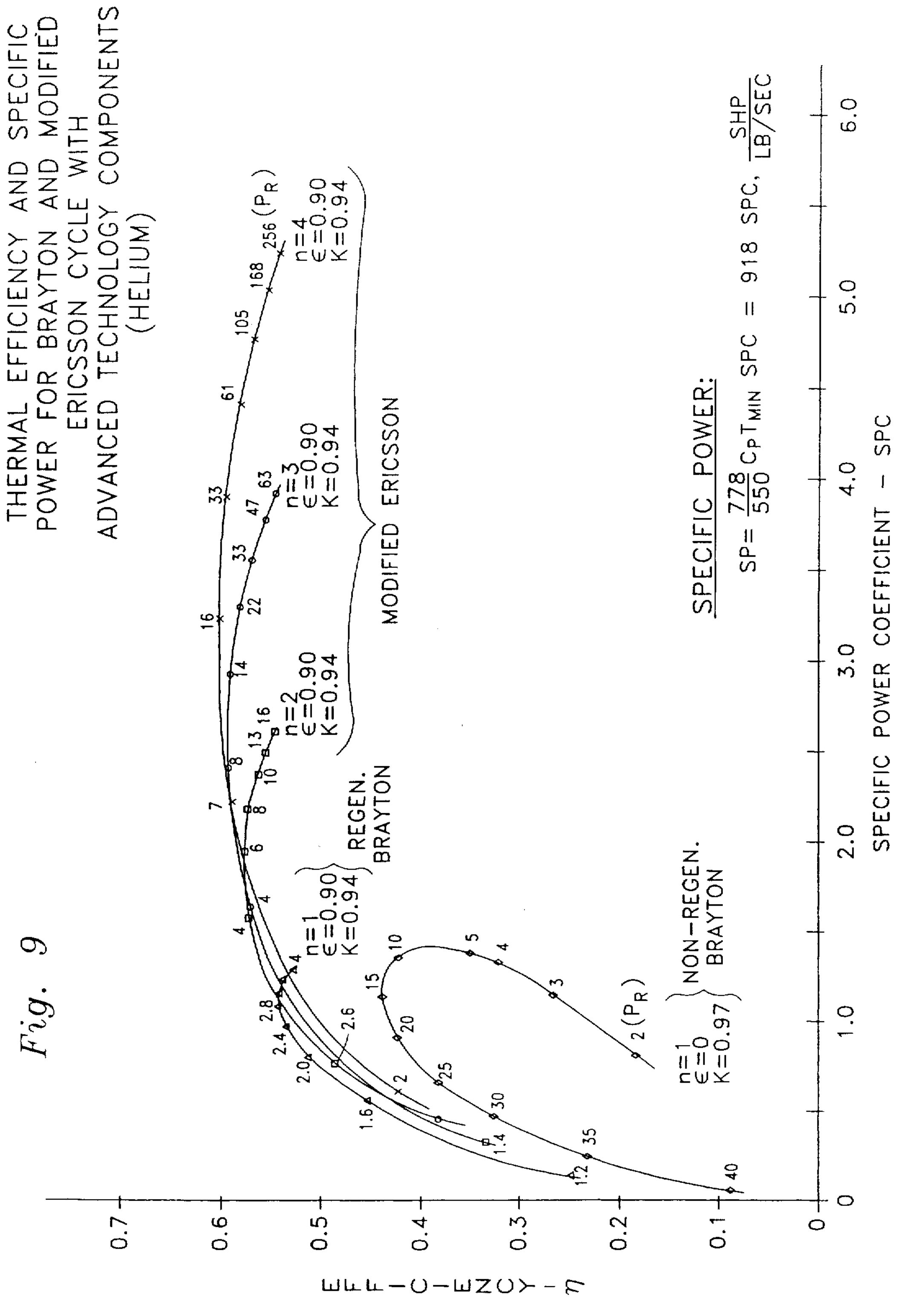

The basic characteristic of a Modified Ericsson cycle for four stages of compression 60 is shown in FIG. 6 on a temperature-entropy diagram. The number of compressions may vary from 2 to greater than 4 stages, however, the gain in efficiency becomes incrementally smaller as the number of stages increase. When only a single stage is used, the cycle is called a Brayton cycle; that may or may not have regeneration. A universal efficiency equation 61 for all these cycles is included in FIG. 6. A close examination of the input power equation 62 shows that as the number of stages increases, the regenerator effectiveness becomes less critical to the over-all cycle efficiency.

Figure 7:
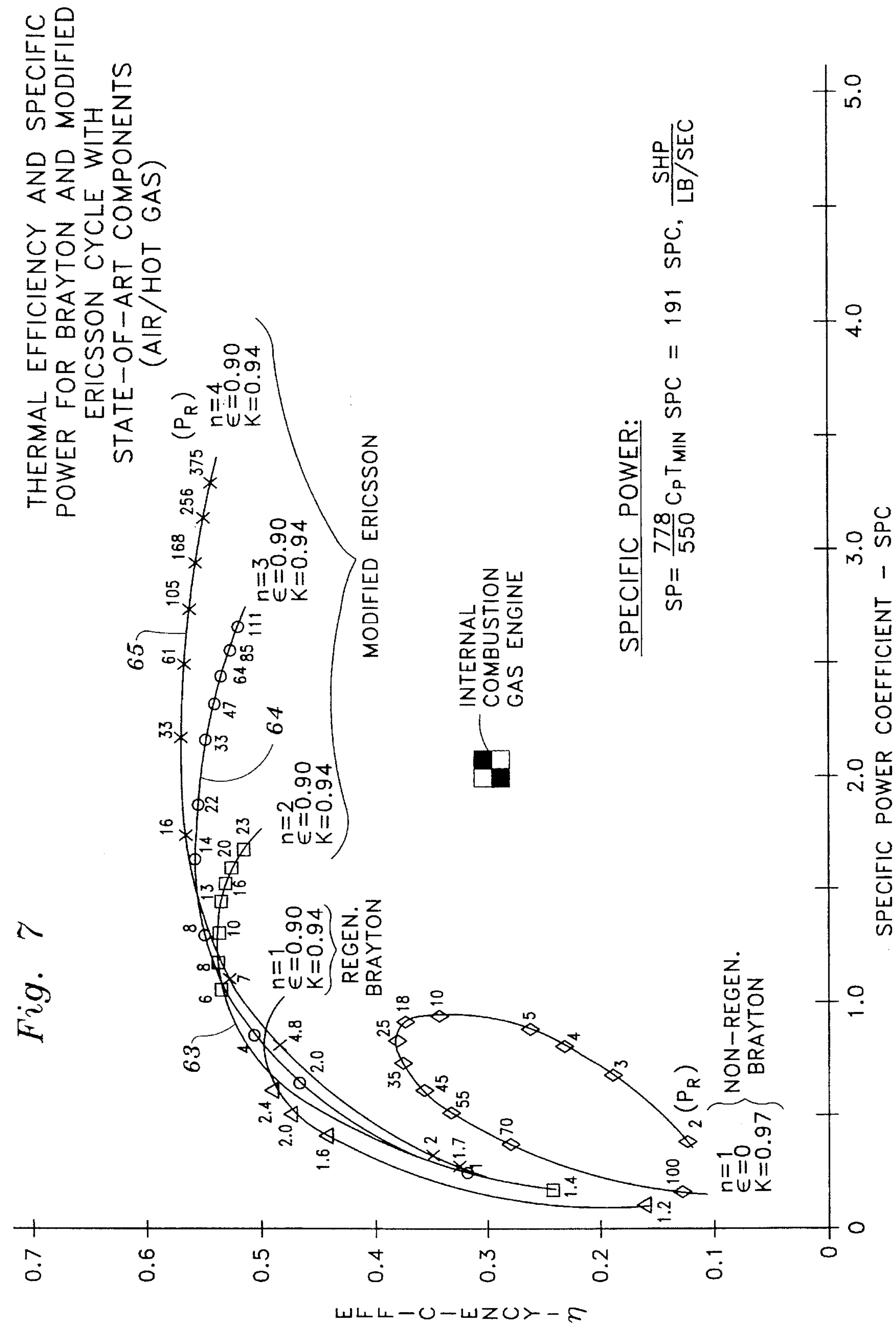
FIG. 7 is a thermal efficiency graph illustrating performance characteristics of Brayton and Modified Ericsson cycles for air/fuel/hot-gas utilizing state-of-the-art component technology.

Performance characteristics of the Modified Ericsson engine using state-of-the-art technology 62 (turbine temperature of 2600° R), is presented in FIG. 7. These efficiencies 63 64 65 (0.50 to 0.58) are approximately 50% higher than those achievable by current internal combustion gas (0.30) and Diesel (0.40) engines.

Performance characteristics of the engine using lower technology machinery (turbine temperature of 1900° R), would have efficiencies in the 30 to 40 percent range and still remain competitive. Advanced technology machinery, (turbine temperature of 3000° R), increases the efficiency to the 0.55 to 0.65 range; nearly twice current internal combustion gas engine efficiencies.

Figure 8:
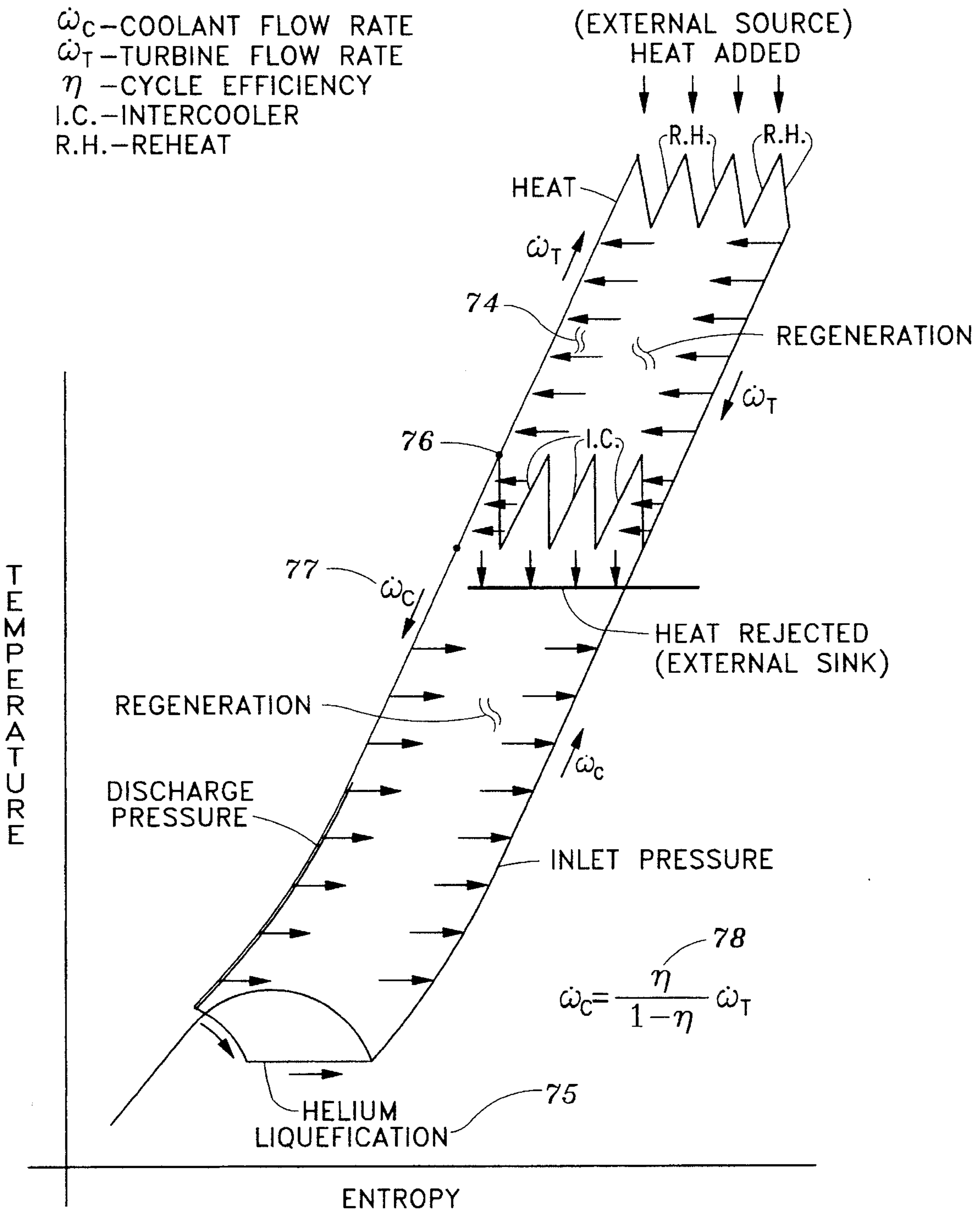
FIG. 8 is a thermal cycle diagram illustrating the use of METRE for refrigeration applications (i.e. helium liquefication), an embodiment of this invention.

Another embodiment of this invention applies to refrigeration applications. For illustrative purposes, a four (4) stage METRE 74, FIG. 8, is used for helium liquefication 75. For this application power is not generated and the excess helium flow, not required as drive turbine gas, is tapped-off at the last stage of intercooler output 76. The amount that may be tapped-off 77 is a function of the cycle efficiency 78.

Figure 9:
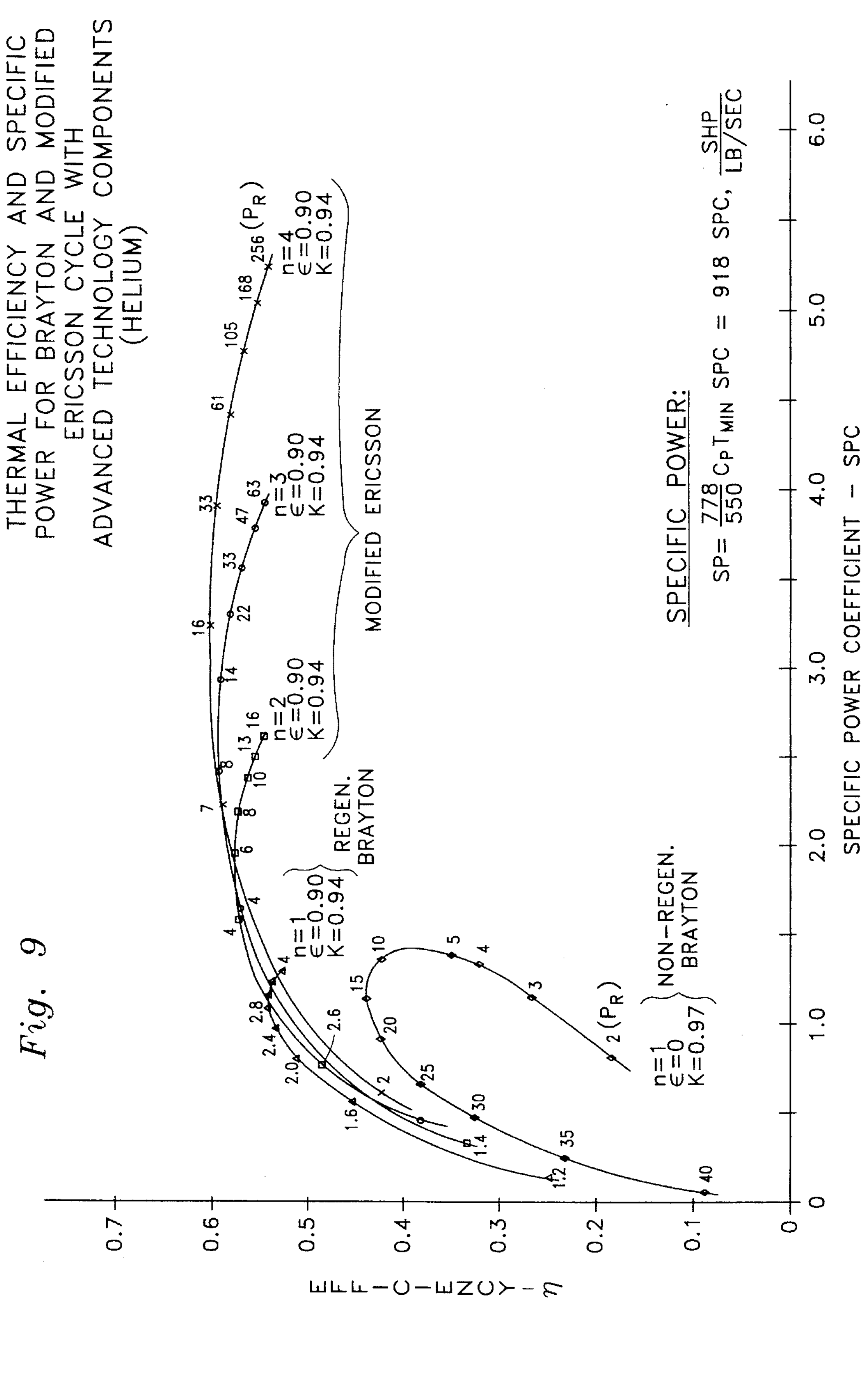
FIG. 9 is a thermal efficiency graph illustrating the performance characteristics of Brayton and Modified Ericsson cycles for helium utilizing advanced technology components.
Figure 1:
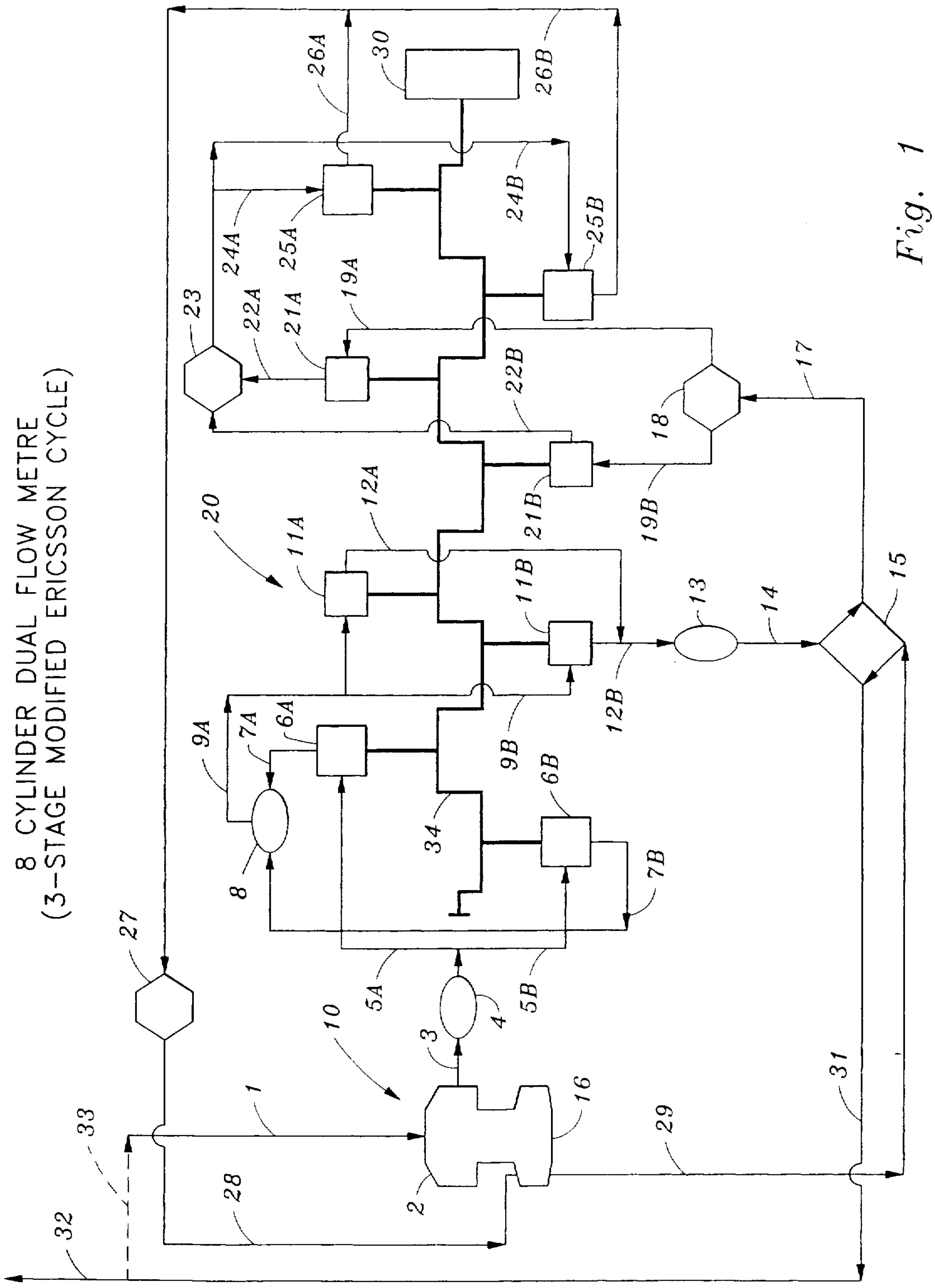
Figure 2:
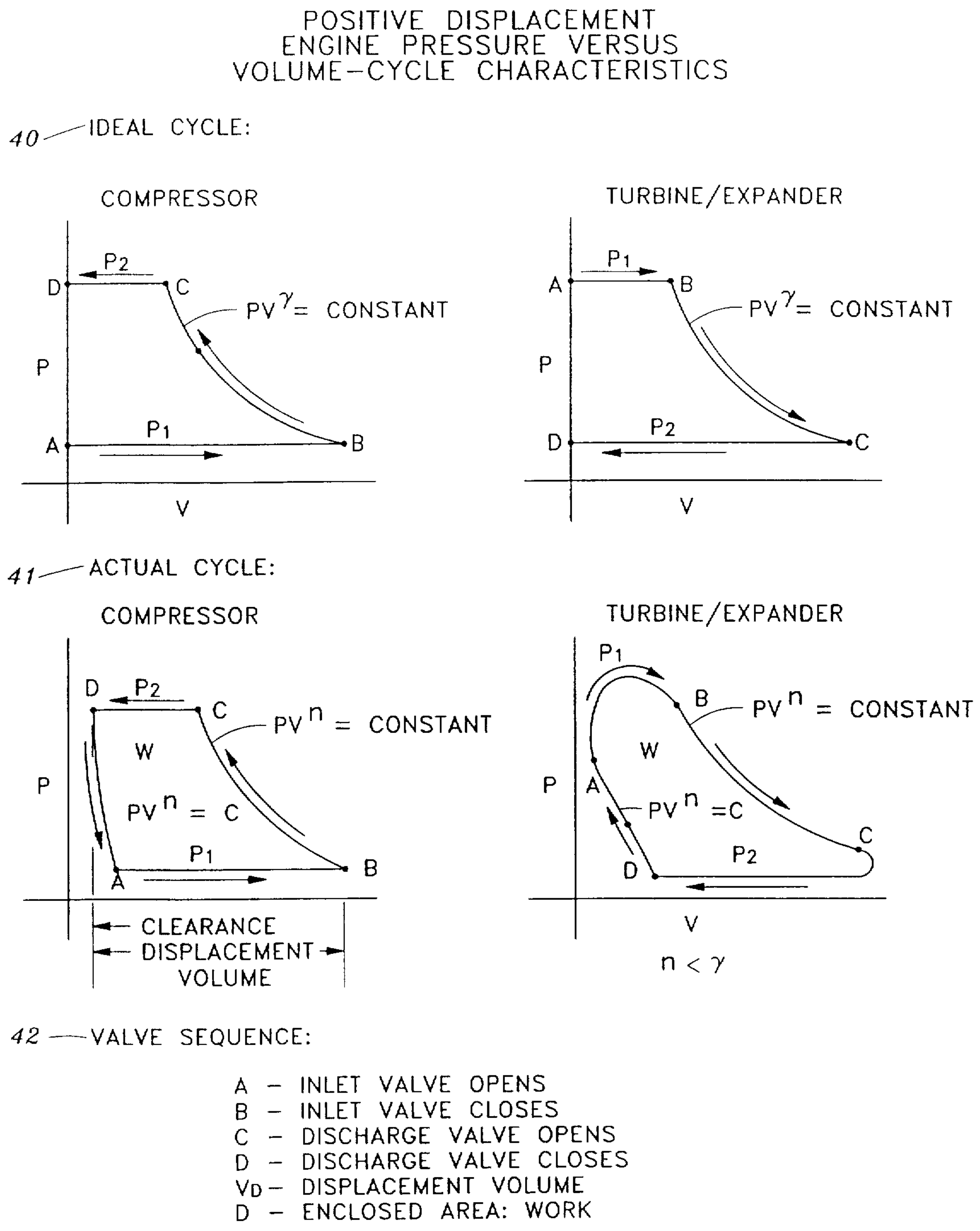
Figure 3:
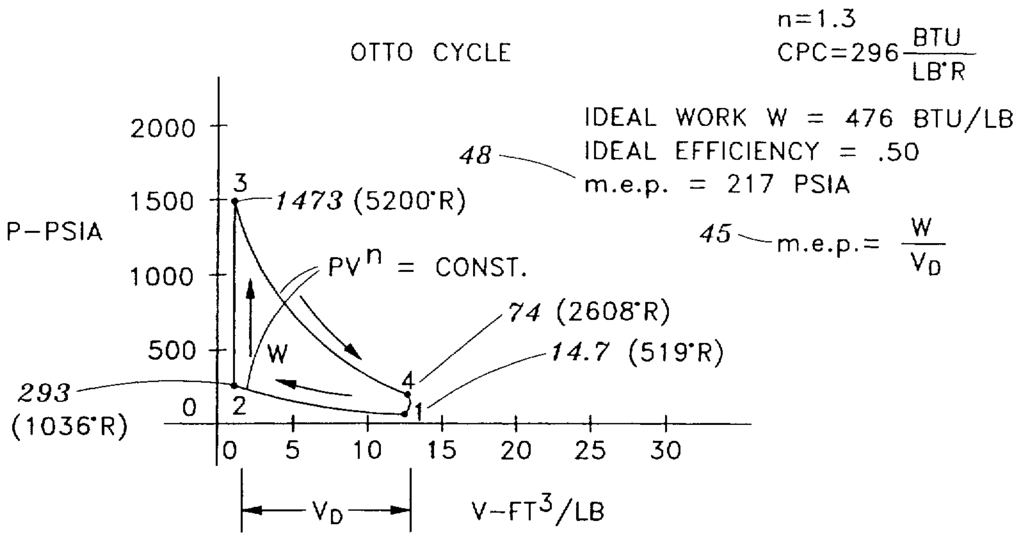
Figure 3:
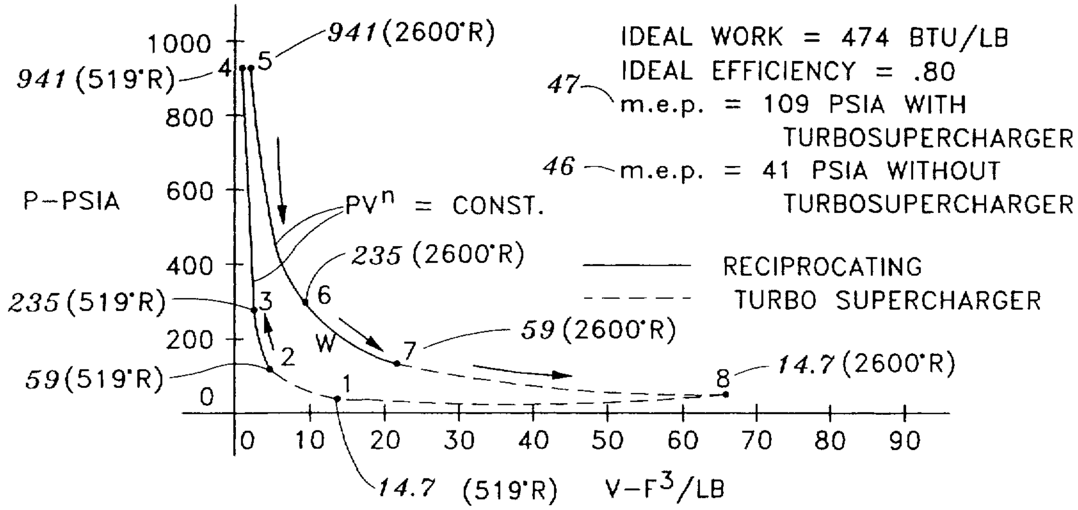
Figure 4:
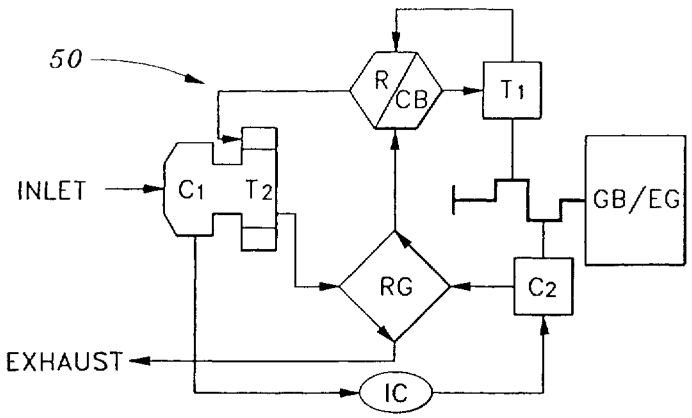
Figure 4:
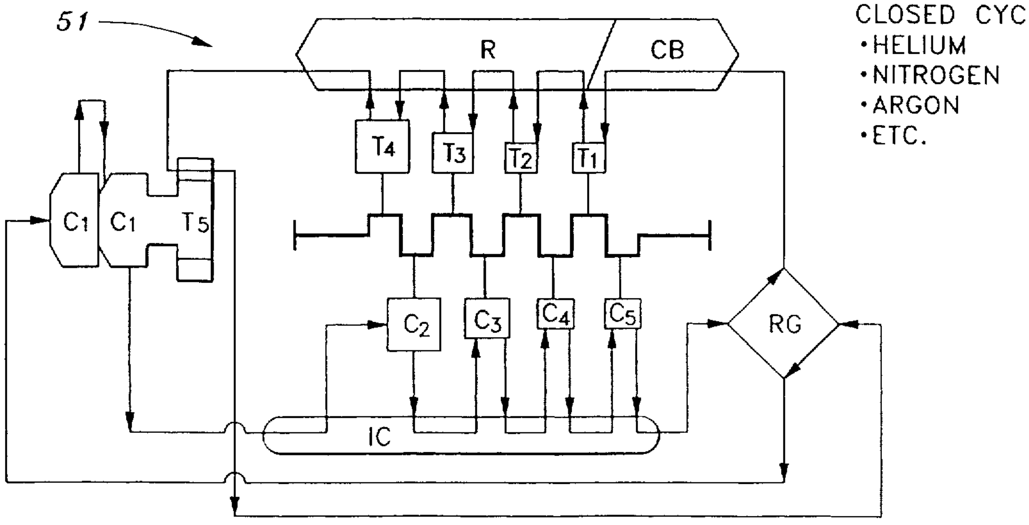
Figure 5:
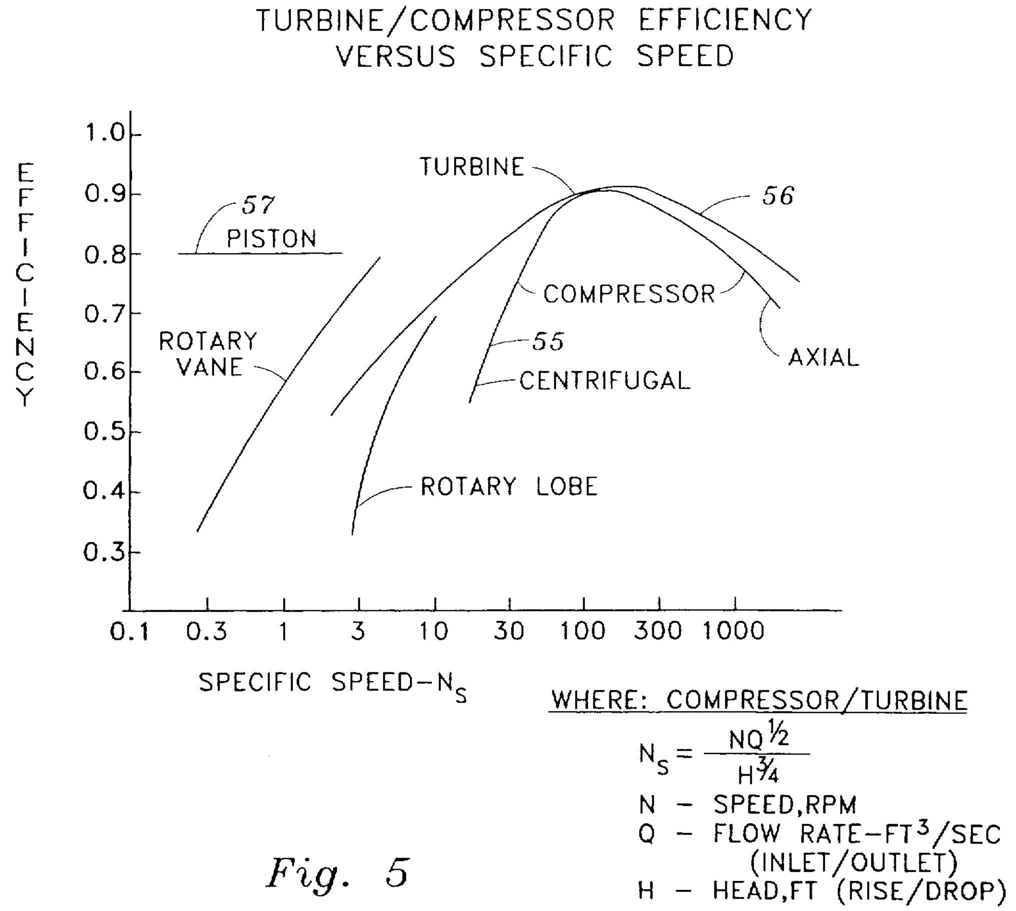

The cycle efficiencies and specific power coefficient (SPC) for helium, using advanced technology 80, is presented in FIG. 9. Based on these predicted efficiencies, the amount of helium tap-off flow 77 is approximately 60% of the total system flow rate.

Having described the preferred embodiments of the invention, it should now be apparent that numerous modifications could be made thereto without departing from the scope and fair meaning of this invention as described hereinabove and as claimed.

What is claimed:

1. A two (2) stage modified Ericsson cycle supercharged reciprocating gas power system comprising in combination:

at least one dynamic compressor having an input adapted to receive gas from a supply and having a discharge, said dynamic compressor including a means to raise a pressure of the gas to a value greater than at said input;

a first intercooler including means for receiving the gas from one said dynamic compressor discharge, and having an output, said first intercooler including means to cool the gas;

at least one reciprocating compressor having an input adapted to receive the gas from said first intercooler output and having a discharge, said reciprocating compressor including a means to raise the pressure of the gas to a value greater than at said input;

a regenerator having a high pressure gas inlet in fluid communication with a high pressure gas outlet, said high pressure gas inlet adapted to receive the gas from said discharge of one of said reciprocating compressors having a highest pressure, said regenerator including means to heat the gas passing into said high pressure gas inlet;

a first heater including a means for receiving the gas from said high pressure gas outlet of said regenerator and having an outlet, said first heater including a means for variable heating of the gas;

at least one reciprocating expander including a means for receiving the gas from said first heater outlet and having an exhaust, at least one of said at least one reciprocating expanders adapted to drive a corresponding one of said at least one reciprocating compressors;

a last heater including a means for receiving the gas from one said reciprocating expander exhaust and having an outlet, said last heater including a means for variable heating of the gas; and at least one dynamic turbine including a means for receiving the gas from said last heater outlet and having a low pressure exhaust, at least one of said at least one dynamic turbines adapted to drive a corresponding one of said at least one dynamic compressors;

said regenerator including a means for receiving the gas from said at least one dynamic turbine low pressure exhaust, means to transfer heat from said at least one dynamic turbine low pressure exhaust to the gas between said high pressure gas inlet and said high pressure gas outlet, and a low pressure outlet, and wherein at least one of said at least one reciprocating expanders is coupled to a means to output power from said system.

2. The system of claim 1, wherein said engine includes a single dynamic compressor and a single dynamic turbine, said dynamic turbine directly coupled to said dynamic compressor.

3. A two (2) stage Modified Ericsson cycle supercharged reciprocating gas power system comprising in combination;

at least one dynamic compressor having an input adapted to receive gas from a supply and having a discharge, said dynamic compressor including a means to raise a pressure of the gas to a value greater than at said input;

a first intercooler including means for receiving the gas from one said dynamic compressor discharge, and having an output, said first intercooler including means to cool the gas;

at least one reciprocating compressor having an input adapted to receive the gas from said first intercooler output and having a discharge, said reciprocating compressor including a means to raise the pressure of the gas to a value greater than at said input;

a regenerator having a high pressure gas inlet in fluid communication with a high pressure gas outlet, said high pressure gas inlet adapted to receive the gas from said discharge of one of said reciprocating compressors having a highest pressure, said regenerator including means to heat the gas passing into said high pressure gas inlet;

a first heater including a means for receiving the gas from said high pressure gas outlet of said regenerator and having an outlet, said first heater including a means for variable heating of the gas;

at least one reciprocating expander including a means for receiving the gas from said first heater outlet and having an exhaust, at least one of said at least one reciprocating expanders adapted to drive a corresponding one of said at least one reciprocating compressors;

a last heater including a means for receiving the gas from one said reciprocating expander exhaust and having an outlet, said last heater including a means for variable heating of the gas; and at least one dynamic turbine including a means for receiving the gas from said last heater outlet and having a low pressure exhaust, at least one of said at least one dynamic turbines adapted to drive a corresponding one of said at least one dynamic compressors;

said regenerator including a means for receiving the gas from the said dynamic turbine low pressure exhaust, means to transfer heat from said dynamic turbine low pressure exhaust to the gas between said high pressure gas inlet and said high pressure gas outlet, and a low pressure outlet, wherein said engine includes a single dynamic compressor and a single dynamic turbine, said dynamic turbine directly coupled to said dynamic compressor, and wherein each of said at least one reciprocating compressors and each of said at least one reciprocating expanders is coupled to a common crankshaft, said crankshaft oriented such that work is done by at least one of said at least one reciprocating expanders on at least one of said at least one reciprocating compressors, said crankshaft also coupled to a means to output energy from said system.

4. The system of claim 3 wherein a single reciprocating compressor and a single reciprocating expander are provided in said system.

5. The system of claim 4, wherein said means to output power from said system is an electric generator.

6. A modified Ericsson cycle reciprocating engine comprising in combination:

a supply of low pressure gas;

at least one dynamic compressor and at least one reciprocating compressor, each said compressor including an input, a discharge and means to increase a pressure of the gas between said input and said discharge;

at least one dynamic expander and at least one reciprocating expander, each said expander including a means to receive the gas, an exhaust and means to do work;

at least one intercooler, each intercooler including a means to receive the gas, an output and a means to cool the gas between the receiving means and the output;

at least two heaters, each heater including a means to receive the gas, an outlet and a means to heat the gas between the receiving means and the outlet;

a regenerator including a high pressure inlet in fluid communication with a high pressure outlet, a means for receiving low pressure gas in fluid communication with a low pressure outlet, and means to transfer heat between high pressure gas and low pressure gas;

wherein said input of one of said compressors having a lowest pressure is coupled to said supply of gas;

wherein said discharge of said lowest pressure compressor is coupled, through at least one of said intercoolers and at least one of said compressors having a higher pressure, to said high pressure inlet of said regenerator;

wherein said receiving means of one of said heaters having a highest pressure is coupled to said high pressure outlet of said regenerator;

wherein said receiving means of one of said expanders having a highest pressure is coupled to said outlet of said highest pressure heater;

wherein said exhaust of said highest pressure expander is coupled, through at least one of said heaters having a lower pressure, to at least one of said expanders having a lower pressure; and wherein at least one of said at least one reciprocating expanders is coupled to a means to output energy from said system.

7. The engine of claim 6, wherein a power output means is coupled to said means to do work of at least one of said turbines, such that useful power is provided by said engine.

8. The engine of claim 6, wherein a tap out is provided between said discharge of at least one of said at least one compressors and said high pressure inlet of said regenerator and a tap in is provided between said low pressure outlet of said regenerator and said input of at least one of said at least one compressors, and wherein said tap in and said tap out include a means to route a portion of the gas through a refrigeration apparatus oriented between said tap in and said tap out, such that useful power for refrigeration is provided by said engine.

9. The engine of claim 6, wherein a highest pressure one of said intercoolers has its output adjacent said high pressure inlet of said regenerator.

10. The engine of claim 6, wherein a system discharge duct is oriented adjacent said exhaust of one of said expanders having a lowest pressure, said duct open to an ambient atmosphere, such that said engine operates as an open cycle.

11. The engine of claim 10, wherein said supply of low pressure gas is a duct open to an ambient atmosphere, and wherein a means to insert fuel into the gas is provided.

12. The engine of claim 6, wherein a return duct is interposed between said exhaust of one of said expanders having a lowest pressure and said supply of gas, such that said engine operates as a closed cycle.

13. The engine of claim 12, wherein said means to heat the gas within each said heater includes a heat source external to the gas.

14. The engine of claim 6, wherein said lowest pressure compressor is a dynamic compressor and all higher pressure compressors are reciprocating compressors.

15. The engine of claim 14, wherein said lowest pressure expander is a dynamic expander and all higher pressure expanders are reciprocating expanders.

16. A modified Ericsson cycle reciprocating engine comprising in combination:

a supply of low pressure gas;

at least one dynamic compressor and at least one reciprocating compressor, each said compressor including an input, a discharge and means to increase a pressure of the gas between said input and said discharge;

at least one dynamic expander and at least one reciprocating expander, each said expander including a means to receive the gas, an exhaust and means to transfer power;

at least one intercooler, each intercooler including a means to receive the gas, an output and a means to cool the gas between the receiving means and the output;

at least two heaters, each heater including a means to receive the gas, an outlet and a means to heat the gas between the receiving means and the outlet;

a regenerator including a high pressure inlet in fluid communication with a high pressure outlet, a means for receiving low pressure gas in fluid communication with a low pressure outlet, and means to transfer heat between high pressure gas and low pressure gas;

wherein said input of one of said compressors having a lowest pressure is coupled to said supply of gas;

wherein said discharge of said lowest pressure compressor is coupled, through at least one of said intercoolers and at least one of said compressors having a higher pressure, to said high pressure inlet of said regenerator;

wherein said receiving means of one of said heaters having a highest pressure is coupled to said high pressure outlet of said regenerator;

wherein said receiving means of one of said expanders having a highest pressure is coupled to said outlet of said highest pressure heater;

wherein said exhaust of said highest pressure expander is coupled, through at least one of said heaters having a lower pressure, to at least one of said expanders having a lower pressure;

wherein each of said at least one compressors is driven by said means to do work of at least One of said at least one expanders, wherein said lowest pressure compressor is a dynamic compressor and all higher pressure compressors are reciprocating compressors, wherein said lowest pressure expander is a dynamic expander and all higher pressure expanders are reciprocating expanders, and wherein a crankshaft is coupled to at least one of said at least one reciprocating compressors and at least one of said at least one reciprocating expanders, said crankshaft in turn coupled to a means to supply output power from the engine.

17. The engine of claim 16, wherein said dynamic compressor and said dynamic expander are directly coupled to a common shaft, such that said dynamic expander drives said dynamic compressor.

18. The engine of claim 17, wherein one of said intercoolers having a highest pressure has its output coupled to said high pressure inlet of said regenerator, and wherein each said output of each lower pressure intercooler is split into two ducts which each connect to inputs of a pair of separate said reciprocating compressors, each said pair of reciprocating compressors including compressor discharges which are connected together and to said receiving means of one of said intercoolers having a higher pressure, such that each reciprocating compressor receives only a portion of the gas therethrough.

19. The engine of claim 18, wherein said outlet of one of said heaters having a lowest pressure is coupled to said receiving means of said centrifugal expander, and wherein each said outlet of each higher pressure heater is split into two ducts which each connect to receiving means of a pair of separate said reciprocating expanders, each said pair of reciprocating expanders including turbine exhausts which are connected together and to said receiving means of one of said heaters having a lower pressure, such that each reciprocating expander receives only a portion of the gas therethrough.

* * * * *

UNITED STATES PATENT AND TRADEMARK OFFICE

CERTIFICATE OF CORRECTION

PATENT NO. : 5,590,528
DATED : Jan. 7, 1997
INVENTOR(S) : Viteri

It is certified that error appears in the above-identified patent and that said Letters Patent is hereby corrected as shown below:

The title page should be deleted to appear as per attached title page.

Please delete drawing sheets 1-9 and substitute drawing sheets 1-10 as per attached.

Column 3, line 3, change "Figure 6" to – Figures 6A and 6B --.

Column 3, line 7, change "Figure 7" to – Firgures 7 and 7A --.

Column 3, line 14, change "Figure 9" to –Figures 9 and 9A --.

Column 5, line 8, change "Fig 6" to – Fig 6A and Fig 6B --.

Column 5, line 14, change "Fig 6" to –Fig 6B --.

Column 5, line 20, change "Fig 7" to – Fig 7 and Fig 7A --.

Column 5, line 40, change "Fig 9" to – Fig 9 and Fig 9A --.

Signed and Sealed this

Eighth Day of June, 1999

Attest:

Q. TODD DICKINSON

*Attesting Officer* — *Acting Commissioner of Patents and Trademarks*

United States Patent [19]
Viteri

[11] Patent Number: 5,590,528
[45] Date of Patent: Jan. 7, 1997

[54] TURBOCHARGED RECIPROCATION ENGINE FOR POWER AND REFRIGERATION USING THE MODIFIED ERICSSON CYCLE

[76] Inventor: Fermin Viteri, 3058 Kadema Dr., Sacramento, Calif. 95864

[21] Appl. No.: 137,980

[22] Filed: Oct. 19, 1993

[51] Int. Cl.[6] .......... F02C 1/10
[52] U.S. Cl. .......... 60/684; 60/682
[58] Field of Search .......... 60/650, 682, 684, 60/39.45, 269

[56] References Cited

U.S. PATENT DOCUMENTS

| | | | |
|---|---|---|---|
| 3,797,427 | 3/1974 | Schwartzman | 60/622 |
| 3,995,431 | 12/1976 | Schwartzman | 60/682 |
| 4,403,477 | 9/1983 | Schwarzenbach | 60/682 |

OTHER PUBLICATIONS

Wood, Bernard D. *Applications of Thermodynamics*, 2d. Addison-Wesley Publishing Co., ©1982 Philippines.
Lamm, Michael; "The Big Engine That Couldn't" American Heritage of Invention & Technology, Winter 1993 vol 8/No. 3 pp. 40–47; Forbes Inc., Forbes Bldg 60 Fifth Avenue New York, N.Y. 10011; Plus 4 Pages of Inventors Calculations.
Faires, Virgil Moring; "Applied Thermodynamics," The Macmillan Co. New York, 1949, Copyright 1947 pp. 68, 69, 71, 72, 73, 97, & 128.

*Primary Examiner*—Leonard E. Heyman
*Attorney, Agent, or Firm*—Bradley P. Heisler

[57] ABSTRACT

A Modified Ericsson Turbocharged Reciprocating Engine (METRE), is provided which exhibits a high thermal efficiency for power and refrigeration applications. A Modified Ericsson cycle can include 2, 3, 4, or more stages (number of intercooling and heat/reheat cycles between stages). As stages are added, both cycle efficiency and power density (power/weight flow) increase, therefore, trade-offs between higher performance and number of stages (system complexity, cost, etc.) are necessary to optimize the engine. By combining a turbocompressor for the low pressures of the cycle and a multi-piston reciprocating engine for the high pressures of the cycle, a light weight, highly fuel-efficient, low-polluting, engine can be achieved. The METRE is highly suited for the power range of automobiles and trucks. This engine can use low technology (lower turbine temperatures, efficiencies, etc.) as well as high technology components (higher turbine temperatures, efficiency etc.) and remain competitive with Brayton, Stirling, gas and Diesel engines. The Ericsson cycle, like the Brayton and Stirling, utilizes external combustion or heating and thus can use readily available optional fuels such as natural gas, kerosene, propane, butane and gases derived from coal. Solar and nuclear energy are also useable heat source candidates.

19 Claims, 10 Drawing Sheets

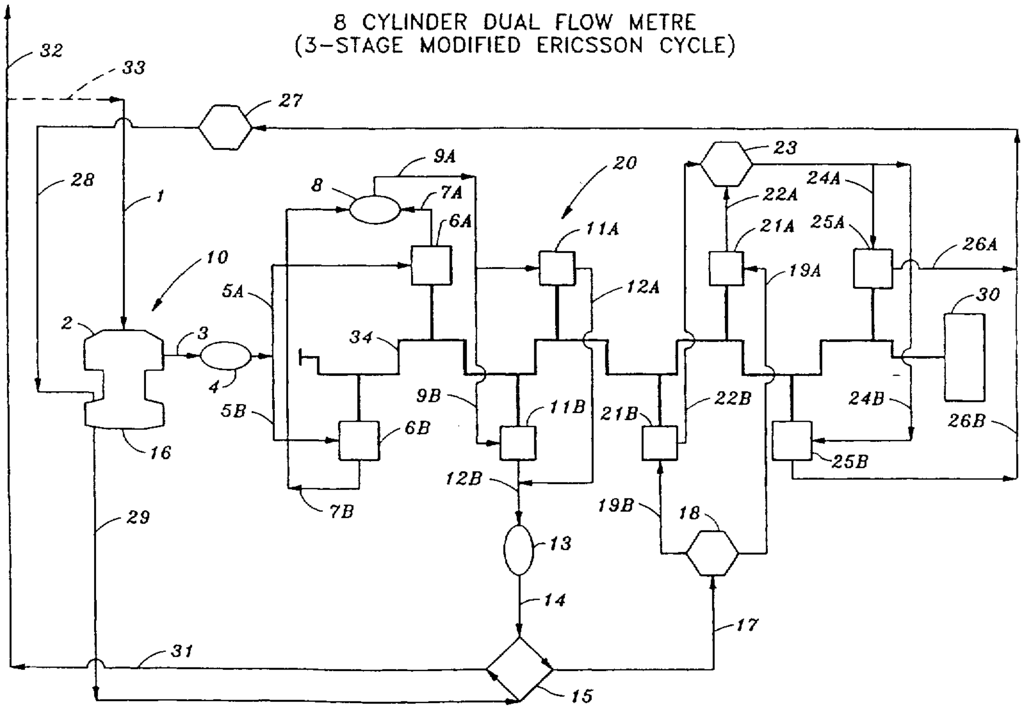

OTTO AND SUPERCHARGED ERICSSON CYCLE PRESSURE VERSUS VOLUME COMPARISON

1 POWER STROKE PER 2 REV.(HC)
COMPRESSION RATIO = 10

3–STAGE MODIFIED ERICSSON CYCLE (METRE)

OVERALL PRESSURE RATIO = 64
STAGE PRESSURE RATIO = 4
1 POWER STROKE PER REVOLUTION (4 CYCLE)

MODIFIED ERICSSON
TURBO-SUPERCHARGED
RECIPROCATING ENGINE (METRE)
CONCEPTS

EG – ELECTRIC GENERATOR
GB – GEARBOX
T – TURBINE
C – COMPRESSOSR
IC – INTERCOOLER
RG – REGENERATOR
CB – COMBUSTOR
R – REHEATER

OPEN CYCLE:
•AIR/FUEL/HOT GAS

2-CYLINDER METRE
2 STAGE MODIFIED ERICSSON

CLOSED CYCLE:
•HELIUM
•NITROGEN
•ARGON
•ETC.

8-CYLINDER METRE
5 STAGE MODIFIED ERICSSON CYCLE $$N_s = \frac{NQ^{1/2}}{H^{3/4}}$$

FOR BRAYTON AND ERICSSON CYCLES

COMPRESSOR POWER COEFFICIENT:

$$CPC = \frac{P_C}{\frac{778}{550} C_P T_{MIN}} = \frac{P_{RS}^{\alpha} - 1}{\eta_C}$$

TURBINE POWER COEFFICIENT WHEN $\epsilon = 1$:

$$TPC = \frac{P_T}{\frac{778}{550} C_P T_{MIN}} = \eta_T T_R \left[\frac{(KP_{RS})^{\alpha} - 1}{(KP_{RS})^{\alpha}}\right]$$

TURBINE POWER COEFFICIENT WHEN $\epsilon < 1$:

$$TPC' = \epsilon TPC + (1 - \epsilon)\left[T_R - 1 - CPC\right]$$

SPECIFIC POWER COEFFICIENT FOR n STAGES:

$$SPC = n(TPC - CPC)$$

INPUT POWER COEFFICIENT FOR n STAGES:

62 $IPC = TPC' + (n-1)TPC = nTPC + (1 - \epsilon)(T_R - 1 - CPC - TPC)$

CYCLE THERMAL EFFICIENCY – $\eta$:

61 $\eta = \frac{SPC}{IPC}$

WHERE:

$\alpha = \frac{\gamma - 1}{\gamma}$ $\gamma$ – GAS SPECIFIC HEAT RATIO $C_P$ – GAS SPECIFIC HEAT RATIO @ CONSTANT PRESSURE $T_R = T_{MAX}/T_{MIN}$ $P_{RS}$ – STAGE PRESSURE RATIO $\eta_C$ – COMPRESSOR EFFICIENCY $\eta_T$ – TURBINE EFFICIENCY $\epsilon$ – REGENERATOR EFFECTIVENESS $K = \left(1 - \frac{\Delta P_{LOSS}}{P}\right)$ PRESSURE LOSS COEFFICIENT $P_C$ – COMPRESSOR SPECIFIC POWER, $\frac{SHP}{LB/SEC}$ $P_T$ – TURBINE SPECIFIC POWER, $\frac{SHP}{LB/SEC}$ n – No. OF INTERCOOLINGS, HEAT/REHEATS (STAGES)

NOTE:

| n | $\epsilon$ | EFFICIENCY |
|---|---|---|
| 1 | 1 | MODIFIED ERICSSON STAGE |
| 1 | <1 | REGENERATIVE BRAYTON |
| 1 | 0 | NONREGENERATIVE BRAYTON |

*Fig. 6B*

THERMAL EFFICIENCY AND SPECIFIC POWER FOR BRAYTON AND MODIFIED ERICSSON CYCLE WITH STATE-OF-ART COMPONENTS (AIR/HOT GAS)

ASSUMPTIONS FOR GRAPH IN Fig. 7 62

$T_{MAX}$ =2600°R
$T_{MIN}$ = 519°R
$\gamma$ = 1.37 SPECIFIC HEAT RATIO
$\eta_C$ = 0.80 COMPRESSOR EFFICIENCY
$\eta_T$ = 0.90 TURBINE EFFICIENCY
$K = 1 - \frac{\Delta P_{LOSSES, LINE LOSSES, ETC.}}{P}$
$\epsilon$ – REGENERATOR EFFECTIVENESS
n – No. OF INTERCOOLINGS, HEAT/REHEAT STAGES
$P_R$ – OVERALL PRESSURE RATIO
$P_{RS} = P_R^{1/n}$ STAGE PRESSURE RATIO
$C_P$ = 0.26 BTU/LB°R GAS SPECIFIC HEAT

*Fig. 7A*

THERMAL EFFICIENCY AND SPECIFIC POWER FOR BRAYTON AND MODIFIED ERICSSON CYCLE WITH ADVANCED TECHNOLOGY COMPONENTS (HELIUM)

ASSUMPTIONS FOR GRAPH IN Fig. 9 80

$T_{MAX}$ =3000°R
$T_{MIN}$ = 519°R
$\gamma$ = 1.659 SPECIFIC HEAT RATIO
$\eta_C$ = 0.85 COMPRESSOR EFFICIENCY
$\eta_T$ = 0.90 TURBINE EFFICIENCY
$K = 1 - \frac{\Delta P_{LOSSES, LINE LOSSES, ETC.}}{P}$
$\epsilon$ – REGENERATOR EFFECTIVENESS
n – No. OF INTERCOOLINGS, HEAT/REHEAT STAGES
$P_R$ – OVERALL PRESSURE RATIO
$P_{RS} = P_R^{1/n}$ STAGE PRESSURE RATIO
$C_P$ = 1.25 BTU/LB°R GAS SPECIFIC HEAT

*Fig. 9A*